United States Patent [19]

Bianco

[11] 4,200,407
[45] Apr. 29, 1980

[54] BOLTED ANNULAR LOCKING COLLAR FOR A SHAFT

[76] Inventor: Romolo P. Bianco, 2803 Grindley Pk., Dearborn, Mich. 48124

[21] Appl. No.: 31,269

[22] Filed: Apr. 18, 1979

[51] Int. Cl.² .............................................. B25G 3/00
[52] U.S. Cl. .................................. 403/261; 403/344; 403/373
[58] Field of Search ............... 403/373, 344, 360, 362, 403/375, 376, 312, 332, 261, 336; 24/24, 71 A; 285/415

[56] References Cited

U.S. PATENT DOCUMENTS

| | | | |
|---|---|---|---|
| 1,294,792 | 2/1919 | Gray | 403/261 |
| 2,781,207 | 2/1957 | Detweiler et al. | 285/415 X |
| 3,380,766 | 4/1968 | Meibuhr | 403/375 |
| 3,415,548 | 12/1968 | Goodman et al. | 403/261 |
| 3,761,114 | 9/1973 | Blakeley | 285/415 X |

Primary Examiner—Wayne L. Shedd
Attorney, Agent, or Firm—Cullen, Sloman, Cantor, Grauer, Scott & Rutherford

[57] ABSTRACT

The expandable annular locking device is particularly applicable for use on mill roll necks, shaft and the like. The annular locking device is adapted to be disposed in an annular groove of a mill roll meck or shaft for retaining one or more sleeve-like members, anti-friction bearings, seals, spacers or the like together as a unit against a fixed abutment of the shaft for maintaining the member or plurality of members in proper working or spaced relationship on the shaft. The annular locking device comprises a pair of arcuate members, each having a pair of flat surfaces. Each arcuate member portends an arc less than 180° and their one ends are pivotally interconnected by an arcuate link whose opposite ends are nested within opposed slots of said members and pivoted thereto. When the arcuate members and links are disposed about a shaft within an annular recess and a preselected spacer sleeve is snugly interposed between the annular locking device and the sleeve-like elements, bearings or the like, and the locking devices are tightly secured to the shaft, the sleeve-like elements are retained against the abutment so as to locate and maintain the various elements on the shaft in the required working relationship.

8 Claims, 6 Drawing Figures

U.S. Patent  Apr. 29, 1980  4,200,407
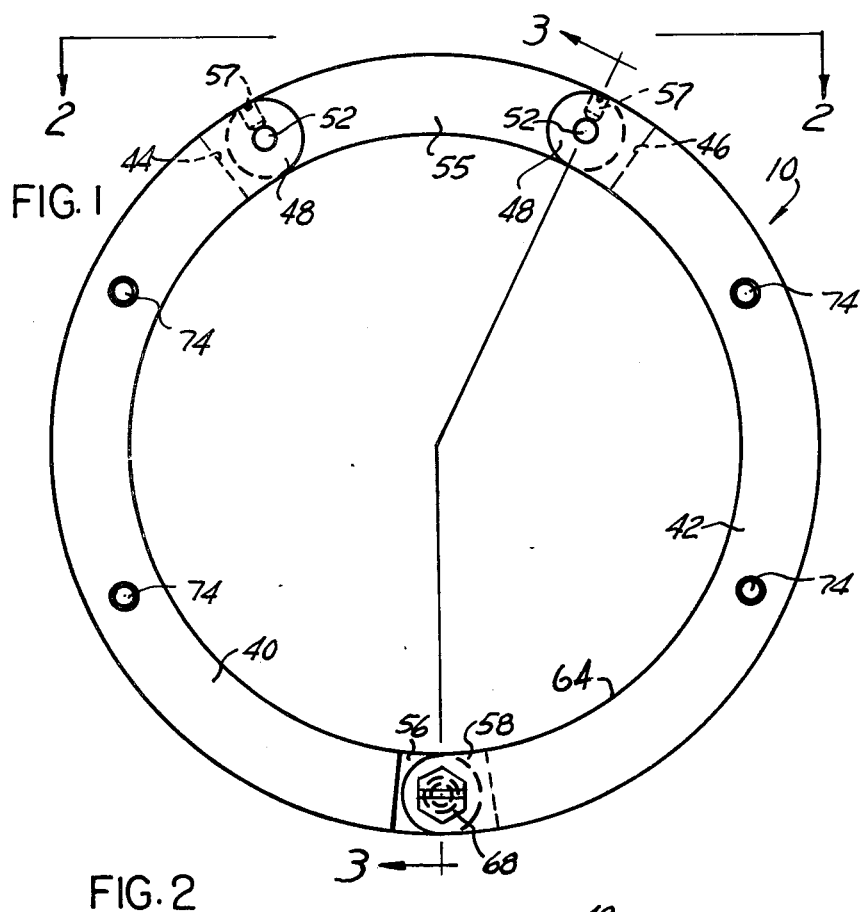
FIG. 1
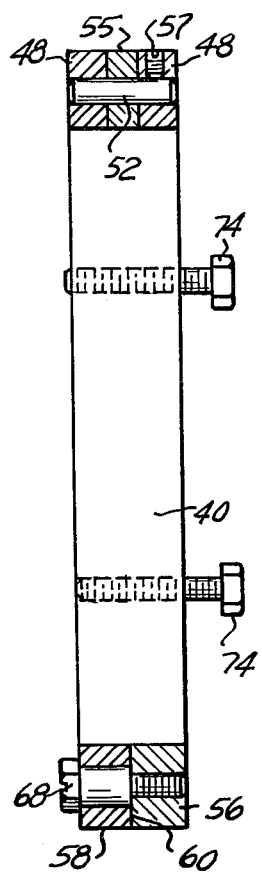
FIG. 3
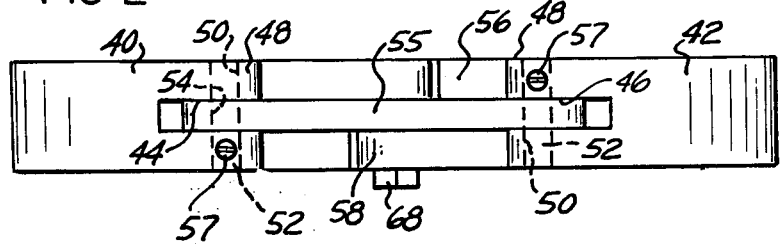
FIG. 2
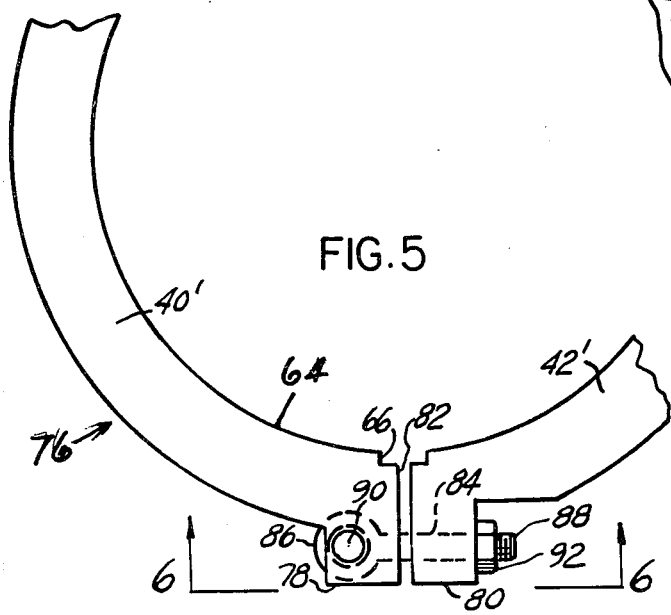
FIG. 4
FIG. 5
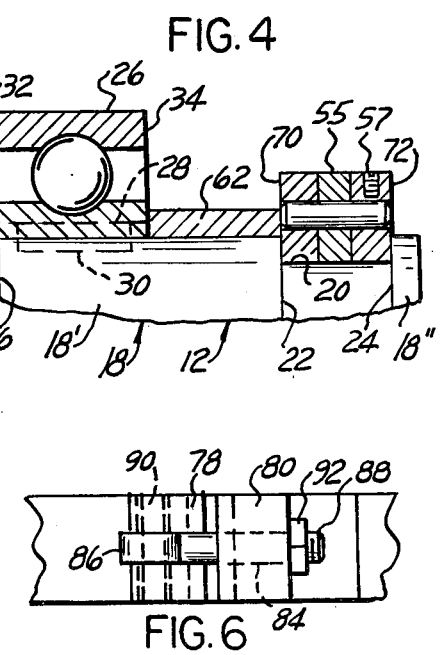
FIG. 6

BOLTED ANNULAR LOCKING COLLAR FOR A SHAFT

BACKGROUND OF THE INVENTION

1. Field of the Invention

The present invention relates generally to the bearing retainer art and more particularly, to an expandable bearing retainer or locking device construction which is particularly applicable for use on mill roll necks, shafts and the like.

2. Description of the Prior Art

In one prior art device, the bearings on mill roll necks are maintained in position adjustably spaced from an outer shoulder by a plurality of members which are accurately machined and then accurately positioned on the mill roll neck. Among these members is included an adjustable nut which is threadedly mounted on an externally threaded split thrust ring, the adjustment of the spacing between the bearing and the shoulder being varied by rotating the nut relative to the threaded split ring. Such a construction is not completely satisfactory because the various parts have to be accurately machined. In addition, when the threaded thrust ring is cut in half, the metal removed by the cutter leaves spaces between the ends of the ring segments so that when the ring is mounted on the roll neck, such spaces have to be compensated for by positioning the ring segments in the same relative positions they occupied prior to the cutting operation. Thus, it is very difficult and often impossible to start the adjusting nut on the externally threaded split ring.

Various solutions have been suggested to the problem of the prior art just described. As an example, the Chievitz U.S. Pat. No. 2,678,856 of May 18, 1954 entitled "Step-Wise Adjustable Bearing Retainer" suggests the use of one or more annular members which are adapted to be mounted on a shaft between a shoulder provided thereon and an anti-friction bearing mounted on the shaft for limited axial movement relative to the shoulder. The annular members contain opposed side faces having different configurations whereby the spacing between the shoulder and the bearing can be varied in what is referred to as a step-wise fashion by reversing and/or interchanging the annular members. Such annular members are preferably formed in segments and an adjustable annular band-like member is removable disposed about them to maintain the segments in a position on the shaft.

The Gray U.S. Pat. No. 1,294,792 of Feb. 18, 1919 entitled "Device For Securing Parts To Their Supports" discloses a device for firmly and rigidly clamping the inner casting member of an anti-friction bearing against a shoulder or abutment on the shaft. One purpose of that invention is to avoid the use of screw threads on or in connection with the clamping devices or parts thereof and to bind the casting member fixedly against the abutment with a great force so as to prevent it from loosening or becoming displaced.

Other patents located during a preliminary novelty investigation in the U.S. Patent and Trademark Office are as follows:

| Name | U.S. Patent No. | Date |
| --- | --- | --- |
| Hughes | 270,672 | January 16, 1883 |
| Buchanan | 1,978,186 | October 23, 1934 |
| Reynolds | 2,584,740 | February 5, 1952 |
| Wadell | 3,413,022 | November 26, 1968 |
| Warda | 3,920,342 | November 18, 1975 |
| Koch | 3,953,141 | April 27, 1976 |

RELATED APPLICATION

The present application represents an improvement in my U.S. Pat. No. 4,136,989 dated Jan. 30, 1979 and my copending patent application, Ser. No. 969,787, filed Dec. 15, 1978 entitled "Expandable Annular Cam-Type Locking Device For A Shaft".

SUMMARY OF THE PRESENT INVENTION

It is a feature of the present invention to provide a novel expandable annular locking device for a shaft for maintaining the spacing between one or more sleeve-like members, bearings, spacers, seals and/or the like located on the shaft and shaft abutment.

A further feature is to provide a locking device which is simple in construction; contains relatively fewer parts than prior art devices; is easy to manufacture; is efficient in operation; and is economical to maintain.

A still further feature is to provide a novel locking device of the aforementioned type wherein, the locking device comprises a pair of arcuate members pivotally interconnected by an arcuate link extending between slotted portions thereof. Threaded fasteners may be carried by the arcuate members in operative engagement with a spacer sleeve engageable with said sleeve-like element for moving the spacer sleeve axially against one or more sleeve-like elements mounted on the shafts.

BRIEF DESCRIPTION OF THE DRAWINGS

FIG. 1 is a front elevational view of the expandable annular locking device;

FIG. 2 is a plan view thereof taken in the direction of arrows 2—2 of FIG. 1;

FIG. 3 is a vertical section taken in the direction of arrows 3—3 of FIG. 1;

FIG. 4 is a fragmentary sectional view showing the locking device in a groove of a mill roll neck or shaft, with the spacer sleeve urging a sleeve-like member against an abutment on the shaft;

FIG. 5 is a fragmentary front elevational view of a modified locking device;

FIG. 6 is a fragmentary section taken in the direction of arrows 6—6 of FIG. 5.

DETAILED DESCRIPTION OF A PREFERRED EMBODIMENT

Referring to the drawings, the expandable locking device is designated by the numeral 10 and is shown in FIG. 4 mounted on a mill roll neck or shaft 12, fragmentarily shown.

The mill roll neck or shaft, hereafter referred to as shaft, is elongated and of generally cylindrical configuration and has a longitudinally extending axis, not shown, which is coincidental to the center axis of the locking device.

The shaft is of varying diameter, FIG. 4, and has a first cylindrical portion 14 providing a first abutment 16 and a second cylindrical portion 18 having a diameter smaller than the first cylindrical portion. An annular groove 20 is provided in the second cylindrical portion 18, the ends of the groove 20 being defined by oppositely facing second and third abutments 22 and 24. The abutments 16, 22 and 24 are axially aligned, parallel and spaced apart. The cylindrical portion 18 is divided by groove 20 into portions 18' and 18".

The elongated shaft 12 is provided with conventional anti-friction type bearings, cone-type bearings, spacers, seals, etc. For purposes of illustration, only a single bearing, spacer or seal is shown and is referred to herein as the sleeve-like member 26. Any number of sleeve-like members may be mounted on shaft 12, as is now utilized in the prior art and such sleeve-like members may include various anti-friction bearings, spacers, seals, etc., which are axially spaced on the shaft in abutting relationship and clamped together as a unit against the first abutment 16 by locking device 10.

The sleeve-like member 26 has a keyway 28 for receiving the elongated key 30 secured to the cylindrical portion 18' for aligning member 26 on the shaft and preventing rotation of same relative to the shaft. The sleeve-like member has a pair of flat and parallel faces 32, 34. Face 32 engages the first abutment 16 when the locking device 10 is in secured position, FIG. 4. The sleeve-like member is mounted on the second cylindrical portion 18 of the shaft at the side of the groove closest to the first abutment 16.

Referring now to FIGS. 1-2, the expendable locking device 10 comprises a pair of split arcuate members, rings or segments 40, 42, hereafter referred to as arcuate members, each having an angular extent of less than 180°, and which are disposed in the annular groove 20 in shaft 12. The split members 40, 42 are cast from aluminum or steel. Members 40, 42 at their one ends are spaced apart and provided with opposed slots 44, 46 respectively of uniform width. End portions 48 of members 40, 42 have transverse parallel bores 50 extending therethrough. Pivot pins 52 extend through openings 50 and through corresponding transverse openings 54 through end portions of arcuate link 55. Said link forms a pivotal articulation between members 40, 42 to permit them to be mounted on shaft 12.

The arcuate members 40, 42 have a second pair of end portions 56, 58 which have opposing flat faces 60. The inner arcuate surface 64 of members 40, 42 adjacent the end portions 56, 58 has a keyway 66, FIG. 5, formed partly in each member 40, 42 which engages a key, not shown, carried by shaft portion 18, defining the groove 20 to prevent the locking device 10 from rotating on the shaft 12.

The end portion 56 of member 40 has a threaded opening to receive the threaded end of shoulder bolt 68 which extends through an opening in end portion 58 of member 42.

The split members 40, 42 each have a pair of first and second flat surfaces 70, 72 respectively. The first surface faces the second abutment 22 while the second surface faces the third abutment 24.

A spacer sleeve 62, preselected as to width, is mounted on shaft position 18' and is snugly interposed between bearing member 26 and walls 70 of members 40, 42.

Spacer sleeve 62 operatively and retainingly engages bearing member 26, holding it against shoulder 16 when arcuate members 40, 42 are clamped onto shaft 12. Link 55 has inner and outer radii corresponding to members 40 and 42 and is of the same height to provide a continuation of said members.

Set screws 57 extend radially into end portions 48 for frictional locking engagement with pins 52.

For increased anchoring of sleeve 62 axially relative to bearing member 26, a series of set screws 74 are adjustably threaded through members 40, 42 with their free ends in operative engagement with sleeve 62.

In the modified locking device 76, FIG. 5, the arcuate members 40' and 42' are pivotally interconnected at one end by a link 55 and pins 52, the same as shown in FIG. 1. The opposite ends of members 40' and 42' have opposed lugs 78, 80 with opposed spaced end faces 82. End portion 78 has a slot to receive eye bolt 84 having a closed loop 86 on one end and a threaded portion 88 which extends through lug 80. Loop 86 is held in lug 78 by pin 90 which extends through openings in said lug on opposite sides of the slot in which said loop is nested. A jamb nut 92 is threaded over the threaded portion 88 of said eye bolt into operative engagement with lug 80. Said eye bolt secures the split arcuate members 40' and 42' together, on shaft 12 within groove 20. It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. In combination, a shaft of varying diameter, with a first portion of the shaft containing a first abutment and with a second portion of the shaft having a diameter smaller than the first portion and being provided with an annular groove having oppositely facing second and third abutments which are axially aligned with and spaced from said first abutment, at least one sleeve-like element mounted on said second portion of the shaft at the side of said groove closest to said first abutment for engagement therewith, a spacer sleeve mounted on said second portion of the shaft at one end operably engaging said sleeve-like element and at its other end extending to said annular groove;

an annular locking device for retaining said sleeve-like element against said first abutment, said locking device being formed by a pair of arcuate members disposed in said annular groove about opposite portions of said shaft, each of said arcuate members having a pair of first and second flat surfaces which face said second and third abutments respectively, said first pair of flat surfaces facing and operatively engaging said spacer sleeve;

first means pivotally interconnecting the one ends of said arcuate members; the adjacent one ends of said arcuate members having opposed central slots in the general plane of said arcuate members;

said first means including an arcuate link extending between said arcuate members at its ends nested within said slots;

and pivot pins extending transversely through end portions of said arcuate members and link;

and second means interconnecting and adjustably securing the other ends of said arcuate members for anchoring said arcuate members within the shaft annular groove and tightly against said spacer sleeve for retaining said sleeve-like element between said first and third abutments.

2. In the combination of claim 1, wherein said second means is a threaded fastener which extends through said other ends and is threaded into one of said other ends.

3. In the combination of claim 1, said central slots extending the height of said arcuate members, said link being of the same height as said arcuate members with its inner and outer arcuate surfaces forming a continuation of the inner and outer arcuate surfaces of said arcuate members.

4. In the combination of claim 1, a plurality of adjustable set screws threaded transversely through said arcuate members in operative engagement with said spacer sleeve.

5. In the combination of claim 1, wherein said arcuate members each have an angular extent less than 180°.

6. In the combination of claim 4, wherein the one ends of said arcuate members are spaced apart;
said link spanning said spaced apart ends to permit the inside diameter of the arcuate members to be varied through the adjustment provided by the pivoting of said arcuate members relative to said link.

7. The locking device of claim 6, wherein said second end portions are adjustably secured together by means of an eye bolt pinned on one end thereof to one arcuate member, with the bolt extending through said arcuate members and having a threaded portion extending beyond said other arcuate member, and a nut threaded to the threaded portion of said eye bolt for maintaining the proper inside diameter of the arcuate members.

8. In the combination of claim 1, wherein said first and second flat surfaces of said arcuate members are parallel to the side surfaces of said link.

* * * * *